(12) United States Patent
Yamane (10) Patent No.: US 11,410,695 B1
(45) Date of Patent: Aug. 9, 2022

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masami Yamane, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/407,471

(22) Filed: Aug. 20, 2021

(30) Foreign Application Priority Data

Feb. 3, 2021 (JP) .............................. JP2021-015846

(51) Int. Cl.
  *G11B 5/60* (2006.01)
  *G11B 5/31* (2006.01)

(52) U.S. Cl.
  CPC ............ *G11B 5/607* (2013.01); *G11B 5/3136* (2013.01); *G11B 5/6064* (2013.01); *G11B 5/6082* (2013.01)

(58) Field of Classification Search
  None
  See application file for complete search history.

(56) References Cited

U.S. PATENT DOCUMENTS

| 7,126,782 B2 | 10/2006 | Koganezawa |
| 7,903,365 B2 | 3/2011 | Watanabe |
| 9,036,290 B2 * | 5/2015 | Johnson ................. G11B 5/607 360/75 |
| 9,093,084 B2 | 7/2015 | Peng et al. |

FOREIGN PATENT DOCUMENTS

| JP | 2005158111 A | 6/2005 |
| JP | 2008204498 A | 9/2008 |

* cited by examiner

*Primary Examiner* — K. Wong
(74) *Attorney, Agent, or Firm* — Kim & Stewart LLP (57) ABSTRACT

A magnetic disk device includes a plurality of magnetic disks, a plurality of sliders each including one or more resistive elements, each of which is arranged to face a recording surface of one of the plurality of magnetic disks, and is provided corresponding to the plurality of magnetic disks, and a processor configured to detect a change in a resistance value of one or more of the plurality resistive elements.

20 Claims, 8 Drawing Sheets

MAGNETIC DISK DEVICE

CROSS-REFERENCE TO RELATED APPLICATION

This application is based upon and claims the benefit of priority from Japanese Patent Application No. 2021-015846, filed Feb. 3, 2021, the entire contents of which are incorporated herein by reference.

FIELD

Embodiments described herein relate generally to a magnetic disk device.

BACKGROUND

Generally, a slider of a magnetic disk device is provided with a thermal resistive element for making a head surface thereof protrude toward a magnetic disk side, and this thermal resistive element is mounted in the vicinity of a read element and a write element. An air bearing surface (ABS) of the slider on which the read element and the write element are mounted is designed so that floating fluctuation of an element portion including the read element and the write element is small. Therefore, even if the slider vibrates for some reason, the vibration near the read element and the write element is smaller than the surroundings, and thermal fluctuation is also small. In addition, a position where the thermal resistive element is disposed is far from a leading side where the magnetic disk is most likely to be damaged and this makes it difficult to detect the contact between the head surface and the magnetic disk.

As described above, it is difficult to detect contact between the slider and the magnetic disk, and thus contact may occur. Such a contact not only causes contamination, but may also damage the magnetic disk and data loss may occur. If read or write is continued in such a state, dust generated by contamination adheres to the slider and damages another area of the magnetic disk. Access by the slider to scratches on the magnetic disk may cause damage to the read element, the write element, and the like provided on the slider, resulting in deterioration of the element. In order to minimize such obstacles, it is necessary to detect the contact between the slider and the magnetic disk as soon as possible.

DETAILED DESCRIPTION

Embodiments provide a magnetic disk device capable of detecting contact between a slider and a magnetic disk.

In general, according to one embodiment, there is provided a magnetic disk device including a plurality of magnetic disks, a plurality of sliders each including one or more resistive elements, each of which is arranged to face a recording surface of one of the plurality of magnetic disks, and a processor configured to detect a change in a resistance value of one or more of the plurality resistive elements. The plurality of the resistive elements are electrically connected to each other through switches which are controlled to electrically connect the resistive elements in series or in parallel.

Hereinafter, embodiments will be described with reference to the drawings. The disclosure is merely an example, and the present disclosure is not limited by the contents described in the following embodiments. Modifications that can be easily conceived by those skilled in the art are naturally included in the scope of disclosure. In order to clarify the explanation, in the drawings, the size, shape, and the like of each part may be changed with respect to an actual embodiment and represented schematically. In a plurality of drawings, corresponding elements may be designated by the same reference numbers and detailed description thereof may be omitted.

Configuration of Magnetic Disk Device

Figure 1:
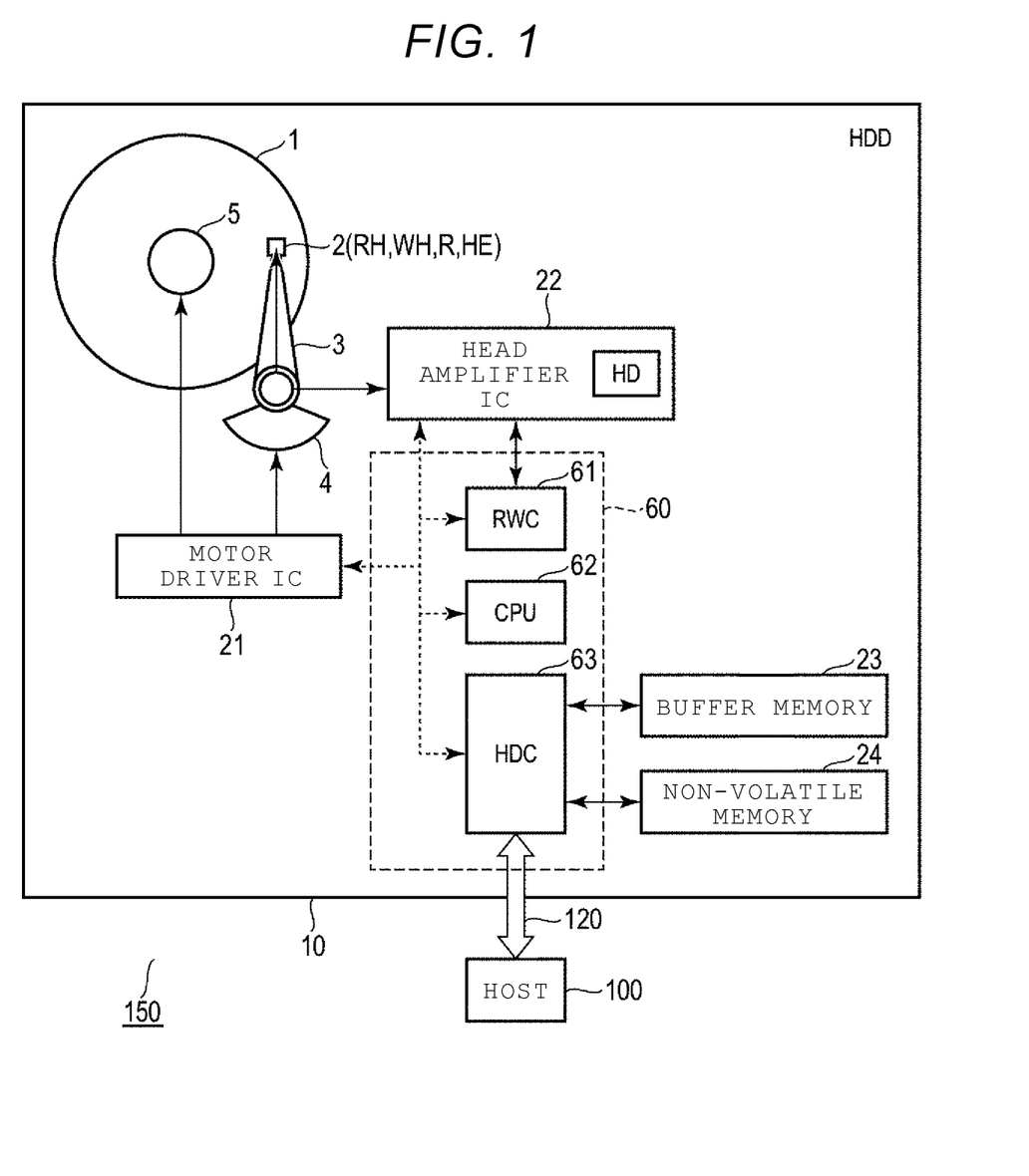
FIG. 1 is a block diagram illustrating an example of a configuration of a system including a magnetic disk device according to an embodiment.

FIG. 1 is a block diagram illustrating an example of a configuration of a system 150 including a magnetic disk device 10 according to an embodiment. In the present embodiment, a hard disk drive (hereinafter, also referred to as HDD) 10 is illustrated as the magnetic disk device 10. The system 150 includes a host 100 and an HDD 10. The host I/F 120 connects the host 100 and the HDD 10, and is used for transmitting and receiving a command, user data, a command response, or a status report between the host 100 and the HDD 10. The host I/F 120 complies with, for example, a serial advanced technology attachment (SATA) standard or a serial attached SCSI (SAS) standard. The HDD 10 is connected to the host 100 via the host I/F 120 and functions as a data storage unit of the host 100. For example, the system 150 is a personal computer, a mobile device, or a server device. For example, the host 100 is a chipset IC provided in the personal computer or the mobile device, or a server controller provided in the server device.

The HDD 10 includes a head-disk assembly (HDA) including a magnetic disk 1, a slider 2, an arm 3, a voice coil motor (VCM) 4, and a spindle motor (SPM) 5. The HDA is accommodated inside a casing (not illustrated) of the HDD 10. The slider 2 includes a head portion including a read head RH and a write head WH, a resistive element R, and a heater element HE.

The HDD 10 includes a circuit block including a motor driver IC (hereinafter, also referred to as a driver IC) 21, a head amplifier IC (hereinafter, also referred to as a head IC) 22, a buffer memory 23, a nonvolatile memory 24, and a controller 60. The controller 60 includes a read and write channel (hereinafter, also referred to as RWC) 61, a CPU 62, and a hard disk controller (hereinafter, also referred to as HDC) 63. The head amplifier IC 22 includes at least a heater driver HD and a resistive element amplifier.

The HDD 10 according to the embodiment executes a process of recording data on the magnetic disk 1 (referred to as a write process), a process of reading the data recorded on the magnetic disk 1 (referred to as a read process), a process of controlling a floating height of a part (mainly the head portion) of the slider 2 with respect to the magnetic disk 1 (referred to as a floating control process), and a process of detecting contact between the slider 2 and the magnetic disk 1. The floating control process may also be referred to as dynamic fly height (DFH) control, and in the following description, the floating control process will also be referred to as DFH control. Here, the floating height corresponds to, for example, a floating amount of the head portion from a surface of the magnetic disk 1. In the DFH control, by supplying a current (or voltage) to the heater element HE provided on the slider 2, a part of the slider 2 (the heater element HE and the peripheral portion of the head portion) is heated and deformed by thermal expansion, and protrudes toward the magnetic disk 1. In the following, the current or voltage supplied to the heater element HE will be described as power supplied to the heater element HE. The amount of protrusion of apart of the slider 2 can be controlled based on information corresponding to the power supplied to the heater element HE.

The magnetic disk 1 is rotated by SPM 5. The rotation of the SPM 5 is controlled by a drive voltage or drive current from the driver IC 21. The arm 3 and VCM 4 are parts of an actuator. The slider 2 is attached to one end of the arm 3. The actuator moves the slider 2 to a target position on the magnetic disk 1. That is, the actuator moves the slider 2 mounted on the arm 3 in a radial direction on the disk 1 by driving the VCM 4. The VCM 4 is controlled by the drive voltage or drive current from the driver IC 21.

The magnetic disk 1 has a recording surface, and a track (in particular, a data track) is formed by recording data on the recording surface. That is, the magnetic disk 1 is configured as a recording medium provided with a recording surface for recording data. The recording surface of the magnetic disk 1 has at least a servo area where servo data for controlling the position of slider 2 on the recording surface is recorded, a user data area for recording user data transmitted from the host 100, and a system area for recording system data for managing the user data recorded in the user data area. The recording surface of the magnetic disk 1 may have a cache area for temporarily recording user data to be recorded in the user data area.

The servo data is data that is recorded during the manufacturing process of the HDD 10 and is not recorded after the HDD 10 is shipped. The system data includes data to be managed during the write process and read process executed by the HDD 10. The system data may be recorded in the nonvolatile memory 24 instead of the system area of the magnetic disk 1. The user data includes not only the data transmitted from the host 100 to be recorded in the future, but also the data already recorded in the user data area or cache area, and the data read from the user data area or the cache area.

The slider 2 includes at least the head portion including the read head RH and the write head WH, the resistive element R, and the heater element HE. The read head RH reads the data recorded on the track on the magnetic disk 1. The data to be read includes servo data, user data, and system data. The write head WH writes user data and system data into the magnetic disk 1. The read head RH is configured as a reading unit, and the write head WH is configured as a recording unit. In the following description, the slider 2 may be referred to as a head or the head portion. The resistive element R is a thermal resistive element, and a resistance value thereof changes when heat is applied. The resistive element R is, for example, an HDI (head-disk interference) sensor, and is used for detecting a distance between the head portion and the recording surface of the magnetic disk. The heater element HE generates heat according to the supplied power to heat a part of the slider 2. A part of the heated slider 2 is thermally expanded and protrudes toward the magnetic disk 1. One heater element HE is provided between the read head RH and the write head WH, or one heater element HE is provided in the vicinity of the read head RH and one in the vicinity of the write head WH. The heater element HE is formed of a resistor or a coil as an electric circuit element. Although a single magnetic disk 1 and a single slider 2 are illustrated in FIG. 1, the HDD 10 may be provided with a plurality of magnetic disks 1 and a plurality of sliders 2 respectively corresponding to the recording surfaces of the plurality of magnetic disks 1.

The head amplifier IC 22 includes a read amplifier, a write driver (both not illustrated), a resistive element amplifier, and a heater driver HD. The read amplifier amplifies a read signal read by the read head RH and outputs the read signal to the RWC 61. The write driver outputs a write current according to write data supplied from the RWC 61 to the write head WH. The resistive element amplifier is connected to the resistive element R provided on the slider 2, amplifies the signal read from the resistive element R, and outputs the signal to the RWC 61. The heater driver HD outputs a heater current (or heater voltage) according to heater data supplied from the CPU 62 or the HDC 63 to the heater element HE. The heater data is data indicating a value corresponding to the heater current (or heater voltage). Hereinafter, the heater current or the heater voltage will be described simply as heater power.

The controller 60 is configured as a one-chip integrated circuit in which at least the RWC 61, the CPU 62, and the HDC is integrated. The controller 60 is configured as a semiconductor circuit such as SoC, FPGA, ASIC, and LSI. The buffer memory 23 is a volatile memory capable of transferring data at a higher speed than the magnetic disk 1, and a DRAM (SDRAM) or SRAM is applied thereto. The nonvolatile memory 24 is a nonvolatile recording unit, and a semiconductor memory such as a NOR or NAND flash memory is applied thereto. The buffer memory 23 and the nonvolatile memory 24 may be provided inside the controller 60 without being connected to the outside of the controller 60. A part of the recording area of the magnetic disk 1 may be allocated as part of the nonvolatile memory 24.

The RWC 61 includes a read channel and a write channel (both not illustrated). The read channel processes the amplified read signal supplied from the head amplifier IC 22 to decode servo data, user data, and data including resistance value data read from the resistive element R. The RWC 61 executes a process related to detection and correction of an error in user data in the read channel, and generates information for evaluating the read user data. Such information may be transmitted to the CPU 62 according to a request from the CPU 62. The RWC 62 transmits the decoded resistance value data to the CPU 62. The read channel includes a Viterbi decoding circuit and an LDPC decoding circuit. The write channel outputs the write data, which is obtained by encoding the data to be written supplied from the HDC 63, to the head amplifier IC 22.

The HDC 63 is connected to the buffer memory 23 and the nonvolatile memory 24, and controls transmission and reception of data transferred between the HDC 63 and the buffer memory 23 and the nonvolatile memory 24. The data transferred between the HDC 63 and the buffer memory 23 includes read data and write data transferred to and from the host 100, and data related to a floating control process. The read data is user data read from the magnetic disk 1, and the write data is user data written into the magnetic disk 1. The data related to the floating control process includes data for setting power to be supplied to the heater element HE. The data transferred between the HDC 63 and the nonvolatile memory 24 includes a program executed by the CPU 62, system data, or the data related to the floating control process. The HDC 63 is connected to the RWC 61 and executes a process on data input from the RWC 61 or data to be output to the RWC 61. The HDC 63 is connected to the host 100 and executes a process for a command and user data transmitted from the host 100, or a command response, a status report, and the user data to be output to the host 100. The process for user data includes a process related to a write data in the write process, a process related to a read data in the read process, and a process related to a servo data required for servo control. The HDC 63 notifies the CPU 62 of a request for execution of the floating control process according to the command input from the host 100. The HDC 63 is configured to include an interface circuit for controlling transmission and reception of data to and from the buffer memory 23, the nonvolatile memory 24, the RWC 61, and the host 100, respectively. The HDC 63 can output heater data to the heater driver HD. Here, the HDC 63 may generate heater data based on an instruction from the CPU 62 and output the generated heater data, or may be supplied with heater data from the CPU 62 and output the supplied heater data.

The CPU 62 is an IC that is also referred to as a microprocessor or a microcontroller. The CPU 62 controls the VCM 4 via the driver IC 21 to execute positioning control (servo control) of the head portion (read head RH and write head WH). The servo control includes at least a control of positioning the head portion at any position in the radial direction of the magnetic disk 1 and a control of moving the head portion from the current position to the target position on the magnetic disk 1. The CPU 62 controls the write process and the read process for the magnetic disk 1 at least via the RWC 61. The CPU 62 controls the floating control process in parallel with the write process and the read process. The servo process can be executed as a part of the write process and the read process. The CPU 62 outputs heater data to the heater driver HD in the floating control process. The CPU 62 detects the contact between the slider 2 and the magnetic disk 1 based on a resistance value data transmitted from the RWC 62. The resistance value data is, for example, a current value or a current value. When the contact is detected, the CPU 62 stores data indicating that the contact has been detected in the nonvolatile memory 24. The CPU 62 utilizes the HDA and the circuit block described above according to the program in controlling the plurality of processes. The CPU 62 is configured as a control unit or a control circuit that controls the plurality of processes.

Comparative Example

Figure 2:
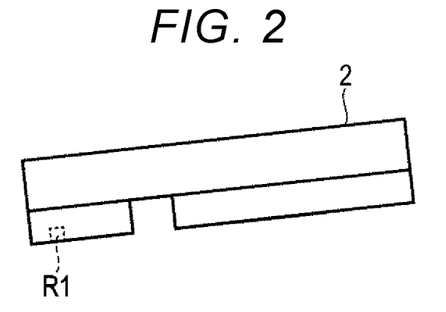
FIG. 2 is a cross-sectional view of a slider according to a comparative example.

Next, an example of connection between the resistive element of the slider and the head amplifier IC in a comparative example different from the embodiment will be described with reference to FIGS. 2 to 5. FIG. 2 is a cross-sectional view of the slider, FIG. 3 is a bottom view of the slider, FIG. 4 is a cross-sectional view of the configuration of a plurality of sliders, and FIG. 5 is a diagram illustrating a connection between resistance elements provided on a plurality of sliders and a head amplifier IC.

Figure 3:
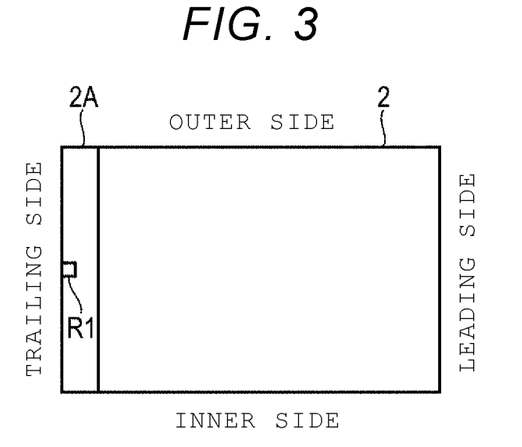
FIG. 3 is a bottom view of the slider according to the comparative example.

As illustrated in FIGS. 2 and 3, the resistive element (thermal resistive element) R1 is provided on the trailing side of the slider 2 and substantially in the center of a side pad 2A. A read head RH and a write head WH (not illustrated) are provided in the vicinity of the position thereof. As described above, in general, the ABS of the slider 2 provided with the read head RE and the write head WH is designed so that the floating fluctuation of the read head RH and the write head WH is small. Therefore, even if the slider 2 vibrates for some reason, the vibration near the read element RE and the write element WH is smaller than the surroundings, the heat fluctuation is also small, the fluctuation of heat becomes small, and thus the change in the resistance value of the resistive element R1 also becomes small, and it becomes difficult to detect the contact between the slider 2 and the magnetic disk 1. The resistive element R1 is provided on the trailing side and is disposed far from the leading side that damages the magnetic disk 1, where the magnetic disk is most likely to be damaged. From such view as well, it becomes difficult to detect the contact between the slider 2 and the magnetic disk 1.

Figure 4:
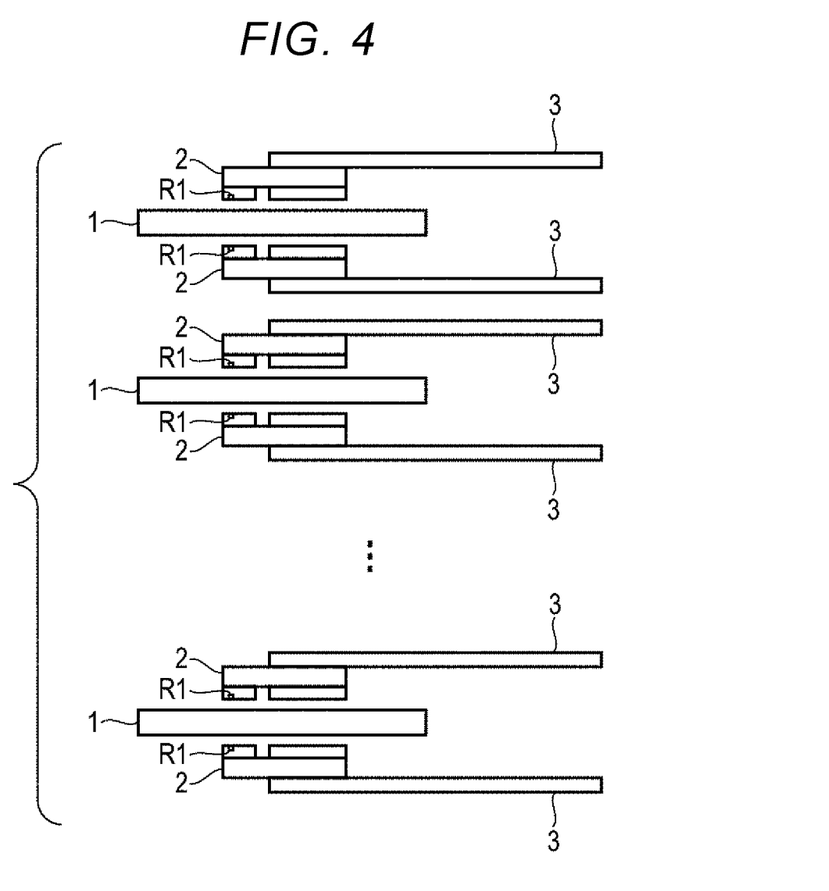
FIG. 4 is a cross-sectional view of a configuration of a plurality of sliders according to the comparative example.
Figure 5:
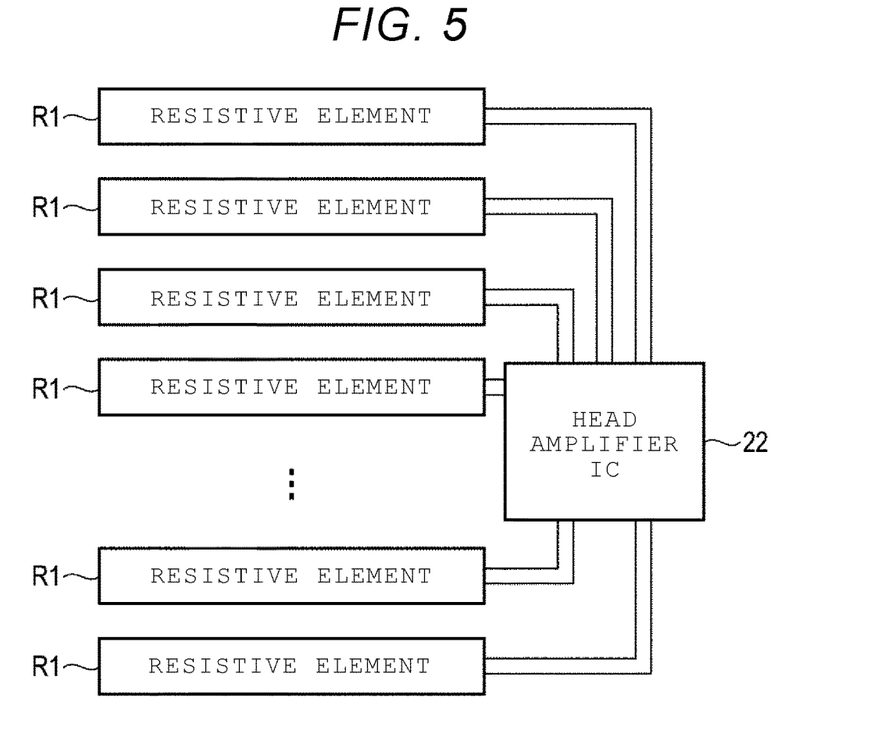
FIG. 5 is a diagram illustrating an example of connection between resistive elements provided on the plurality of sliders and a head amplifier IC according to the comparative example.

As illustrated in FIG. 4, the sliders 2 are respectively provided on both sides of each of the plurality of magnetic disks 1, and the resistance element R1 described with reference to FIGS. 2 and 3 is disposed on each slider 2. As illustrated in FIG. 5, the resistive element R1 of each slider 2 is connected in parallel to the head amplifier IC 22. Therefore, when detecting whether the slider 2 comes into contact with the magnetic disk 1, detection is performed by sequentially switching the slider 2 to be measured by the head amplifier IC 22. Accordingly, although it is possible to detect whether the slider 2 being measured is in contact with the magnetic disk 1, it is not possible to detect whether another slider is in contact with the magnetic disk 1. Accordingly, processing time is required to detect contact between the slider 2 and the magnetic disk 1.

First Embodiment

Figure 6:
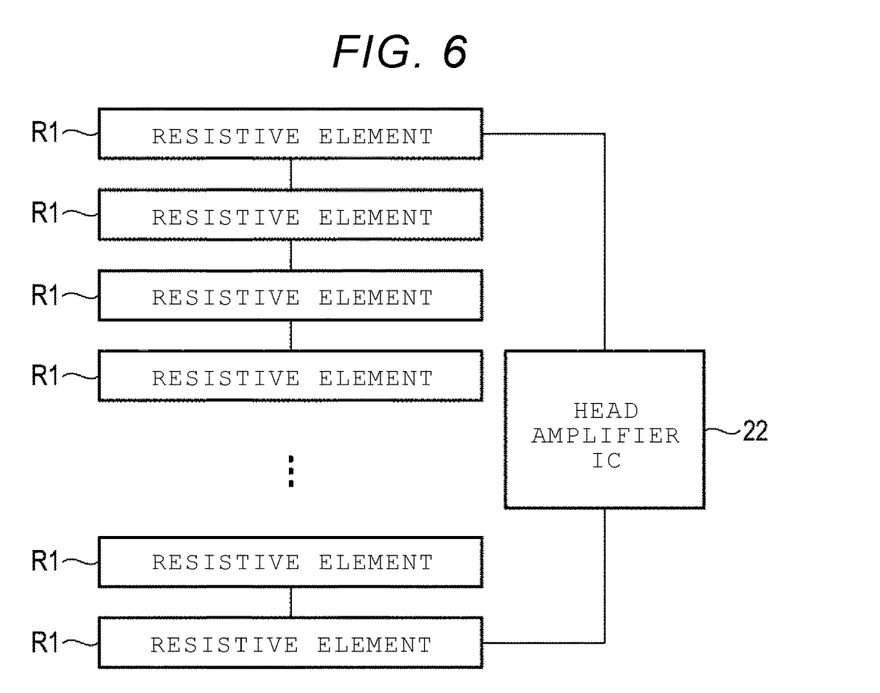
FIG. 6 is a diagram illustrating an example of connection between resistive elements of sliders and a head amplifier IC according to a first embodiment.

Next, an example of connection between the resistive element R1 of the slider 2 and the head amplifier IC 22 in the first embodiment will be described with reference to FIG. 6. The position of the resistive element R1 in the slider 2 is the same as the positions described in FIGS. 2 and 3 described above. In the first embodiment, the plurality of resistive elements R1 and the head amplifier IC 22 are not connected in parallel as illustrated in FIG. 5, but as illustrated in FIG. 6, the plurality of resistance elements R1 and the head amplifier IC 22 are connected in series. Therefore, the CPU 62 can acquire a change in the resistance value of the resistive element R1 connected in series by monitoring the resistance value output via the head amplifier IC 22 and the RWC 61. Therefore, the CPU 62 can detect, based on the change in the resistance value to be monitored, an abnormality, in other words, whether any of the plurality of sliders 2 and the magnetic disk 1 are in contact with each other.

When the configuration illustrated in FIG. 6 is not provided, for example, if some kind of impact is applied from the outside during the operation of the magnetic disk device 10, the presence of the impact can be detected by a shock sensor provided at a predetermined position, but the presence of contact between the slider 2 and the magnetic disk 1 cannot be detected. In the configuration illustrated in FIG. 4, only the presence of contact between the slider 2 of the head portion to be measured and the magnetic disk 1 can be detected. In contrast, in the magnetic disk device 10 of the present embodiment, when an impact is applied, the CPU 62 can monitor the resistance value output via the head amplifier IC 22 and RWC 61, and, for all head portions, detect, based on the change in the resistance value, whether the slider 2 included in any head portion and the magnetic disk 1 are in contact with each other. In a case in which the position of the slider 2 when there is an impact can be checked, the CPU 62 may inspect surroundings of the position for the presence of the contact again. For the inspection, an individual parallel connection mode described later may be used.

During so-called load/unload (LUL), there is a high risk that the slider 2 and the magnetic disk 1 come into contact with each other. Therefore, the CPU 62 can detect whether the LUL is safely performed by monitoring the change in the resistance value of the plurality of resistive elements R1 connected in series during the LUL. Here, when the contact is detected, the CPU 62 may inspect the presence of an abnormality around the LUL area again because there is a concern that the contact may occur in an area on the outer side. For the inspection, the individual parallel connection mode described later may be used.

The CPU 62 can detect, during a seek operation in which the slider 2 moves from a predetermined position on the magnetic disk 1 to another predetermined position, the presence of an abnormal seek operation by monitoring the change in the resistance value of the plurality of resistive elements R1 connected in series. Here, the abnormal seek operation is an operation of performing LUL or contacting an inner stopper during the seek operation. Here, when the contact is detected and the position of the contact can be checked, the CPU 62 may inspect the periphery of the position for the presence of the contact again. For the inspection, the individual parallel connection mode described later may be used.

Since the resistive element R1 is provided on the slider 2, the CPU 62 can check, based on the change in the resistance value of the plurality of resistance elements R1 connected in series, the state (presence of abnormality) of the magnetic disk 1 by taking just one seek operation from the outer side to the inner side (or from the inner side to the outer side). By incorporating such a process into a patrol operation (an operation performed when a command is not received within a certain period of time), the CPU 62 can shorten the time for diagnosing the state of the magnetic disk 1 (for example, the presence and absence of detection of protrusions).

As described above, when the CPU 62 detects that any of the sliders 2 and the magnetic disk 1 are in contact with each other during a predetermined operation, the CPU 62 may store information indicating that the contact has been detected in the nonvolatile memory 24. With such configuration, it is possible to count the number of contacts between the slider 2 and the magnetic disk 1 in correlation with a predetermined operation. Here, the position where the contact is detected and the detection time may also be stored. With such configuration, the CPU 62 can diagnose the state of the magnetic disk device by being compared with a threshold value stored in the nonvolatile memory 24 in advance, and can output an attribute value based on the diagnosis result to the outside. As a result, the user can grasp the state of the magnetic disk device 10. Accordingly, the user can replace the magnetic disk device 10 before a fatal failure occurs in the magnetic disk device 10. In the above description, although the case of detecting the contact between the slider 2 and the magnetic disk 1 during a predetermined operation (during impact, during LUL, during seek operation, during patrol operation) has been described, the contact between the slider 2 and the magnetic disk 1 may be detected during idle and read and write, in addition to or separately from the operations.

As described above, the diagnosis of the magnetic disk device 10 executed by the CPU 62 can be used not only during use by the user after being shipped to the market but also during inspection before shipping. During inspection, an abnormality inspection (for example, protrusion inspection) of the magnetic disk 1 may be performed. During the inspection, in another technique different from the present embodiment, one head and one magnetic disk are inspected one by one. However, according to the present embodiment, the presence of contact between the slider 2 and the magnetic disk 1 is roughly checked in one seek operation, and when there is a point where contact is suspected due to a change in the resistance value, the inspection for checking only the suspicious part again is performed, thereby capable of shortening the inspection time and the manufacturing time of the magnetic disk device 10. For checking again, the individual parallel connection mode described later may be used.

Modification

Next, a modification of disposition of the resistive element R1 will be described with reference to the drawings. Although not illustrated in any of the following modifications, the resistive element R1 and the head amplifier IC 22 are all configured to be connected in series with each other.

Figure 7:
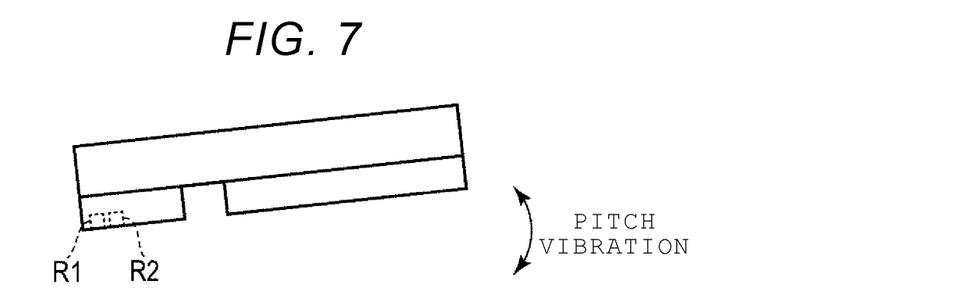
FIG. 7 is a cross-sectional view of a slider according to a modification of the first embodiment.
Figure 8:
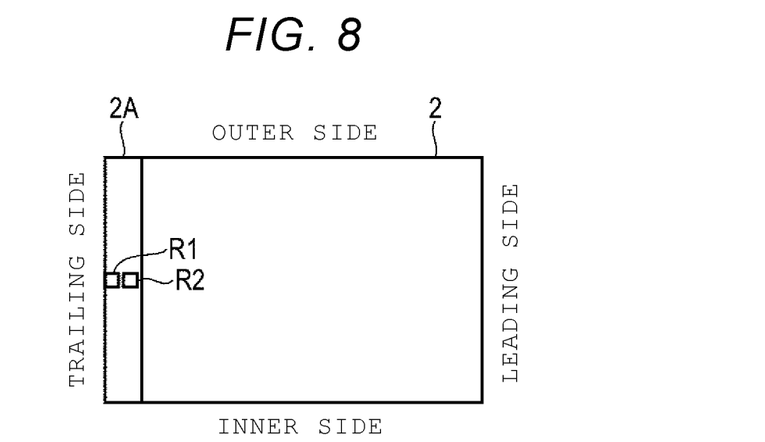
FIG. 8 is a bottom view of the slider according to the modification of the first embodiment.
Figure 9:
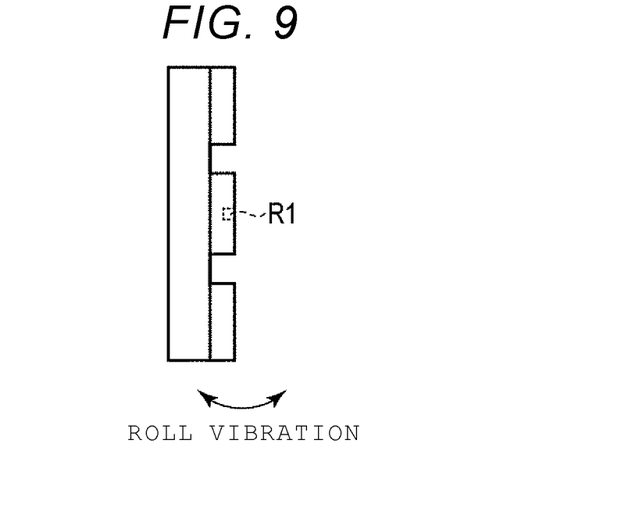
FIG. 9 is a vertical side view of the slider according to the modification of the first embodiment.

First, a first modification will be described with reference to FIGS. 7 to 9. FIG. 7 is a cross-sectional view of the slider 2, FIG. 8 is a bottom view of the slider 2, and FIG. 9 is a vertical side view of the slider 2. The cross-sectional configuration of the plurality of sliders 2 is the same as that of FIG. 4 described above. As illustrated in FIG. 7, the slider 2 pitch-vibrates and roll-vibrates as illustrated in FIG. 9.

As illustrated in FIGS. 7 to 9, the side pad 2A of the slider 2 is provided with a resistive element R2 in addition to the resistive element R1 described above (see FIG. 4). By adding the resistive element R2 as such, it is possible to implement a function of detecting the presence of contact between the slider 2 and the magnetic disk 1 in addition to the function of detecting the distance between the slider 2 and the magnetic disk 1.

Figure 10:
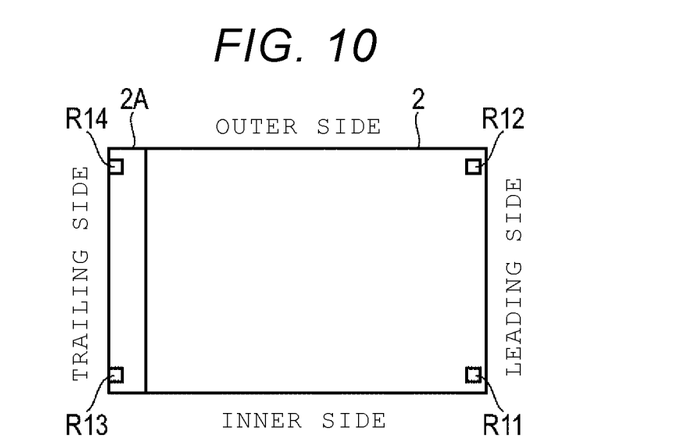
FIG. 10 is a bottom view of the slider according to another modification of the first embodiment.

Next, a second modification will be described with reference to FIG. 10. FIG. 10 is a bottom view of the slider 2. As illustrated in FIG. 10, resistive elements R11, R12, R13, and R14 are provided at four corners of the slider 2. That is, the resistive element R11 is provided on a leading side and an inner side, the resistive element R12 is provided on the leading side and an outer side, and the resistive element R13 is provided on a trailing side and the inner side, and the resistive element R14 is provided on the trailing side and the outer side. By disposing the resistive elements R11, R12, R13, and R14 as such, the CPU 62 can detect the contact between the slider 2 and the magnetic disk 1 regardless of how the slider 2 is tilted with respect to the magnetic disk 1. The contact between the slider 2 and the magnetic disk 1 can be detected by providing at least one of the four resistance elements R11, R12, R13, and R14, but when only one resistance element is provided, it is desirable to provide the resistance element R11, that is, one resistance element in the corner on the leading side and the inner side. It is because the corner on the leading side and inner side of the slider 2 is most likely to come into contact with the magnetic disk 1, and has a high probability of being scratched. When it is difficult to dispose the resistive elements on both the inner side and the outer side, or when the slider 2 comes into contact with the magnetic disk 1 during LUL, it is desirable to dispose the contact points on the inner side where the data area of the magnetic disk 1 is formed, that is, like the resistance elements R11 and R13.

Figure 11:
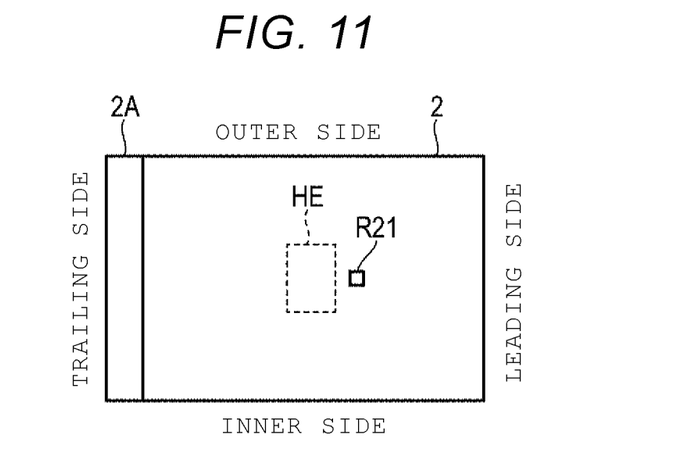
FIG. 11 is a bottom view of the slider according to another modification of the first embodiment.

Next, a third modification will be described. FIG. 11 is a bottom view of the slider 2. As illustrated in FIG. 11, a resistive element R21 is provided in the vicinity of the heater element HE. The heater element HE causes the head surface of the slider 2 to protrude from the magnetic disk 1 by applying a voltage as described above. Therefore, by providing the resistive element R21 in the vicinity of the heater element HE, the CPU 62 can detect the presence of contact between the slider 2 and the magnetic disk 1 at the position where the slider 2 and the magnetic disk 1 are closest to each other. Since the presence of contact can be detected at a distance close to the magnetic disk 1, a S/N ratio can be increased.

Second Embodiment

The second embodiment describes a case where a plurality of head amplifier ICs 22 are provided in the magnetic disk device 10. The same configurations as those in the first embodiment are designated by the same reference numerals, and detailed description of the configurations will be omitted.

Figure 12:
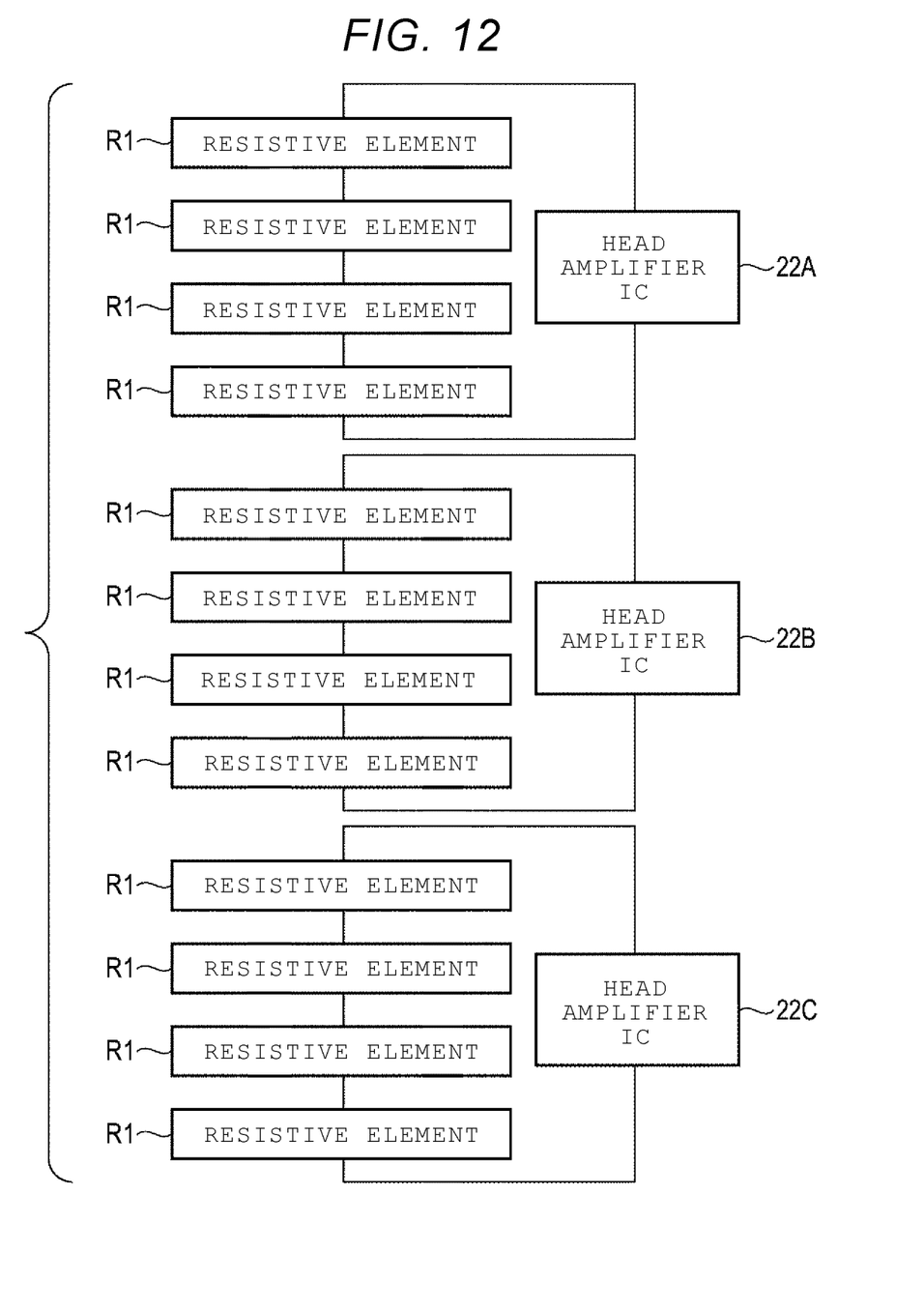
FIG. 12 is a diagram illustrating an example of connection between resistive elements respectively provided on a plurality of sliders and three head amplifiers according to a second embodiment.

FIG. 12 is a diagram illustrating an example of connection between the resistive elements R1 respectively provided on the plurality of sliders 2 and head amplifiers IC 22A, 22B, and 22C. As illustrated in FIG. 12, the plurality of resistive elements R1 are connected in series to the head amplifiers IC 22A, 22B, and 22C, respectively. Therefore, when a plurality of head amplifier ICs 22 are provided in the magnetic disk device 10, the CPU 62 can detect the contact between the slider 2 and the magnetic disk 1 for each of the head amplifier ICs 22A, 22B, and 22C by monitoring the change in the resistance value of the plurality of resistance elements R1 connected in series for each of the head amplifier ICs 22A, 22B, and 22C. In the present embodiment, although the case of three head amplifier ICs 22 has been described, the CPU 62 can detect the contact between the slider 2 and the magnetic disk 1 according to the number of head amplifier ICs provided in the magnetic disk device 10.

Third Embodiment

The third embodiment describes a case where the configuration in which the plurality of resistance elements R1 are connected in series to the head amplifier IC 22 and the configuration in which a plurality of resistance elements are connected in parallel can be switched. The same configurations as those in the first embodiment are designated by the same reference numerals, and detailed description of the configurations will be omitted.

Figure 13:
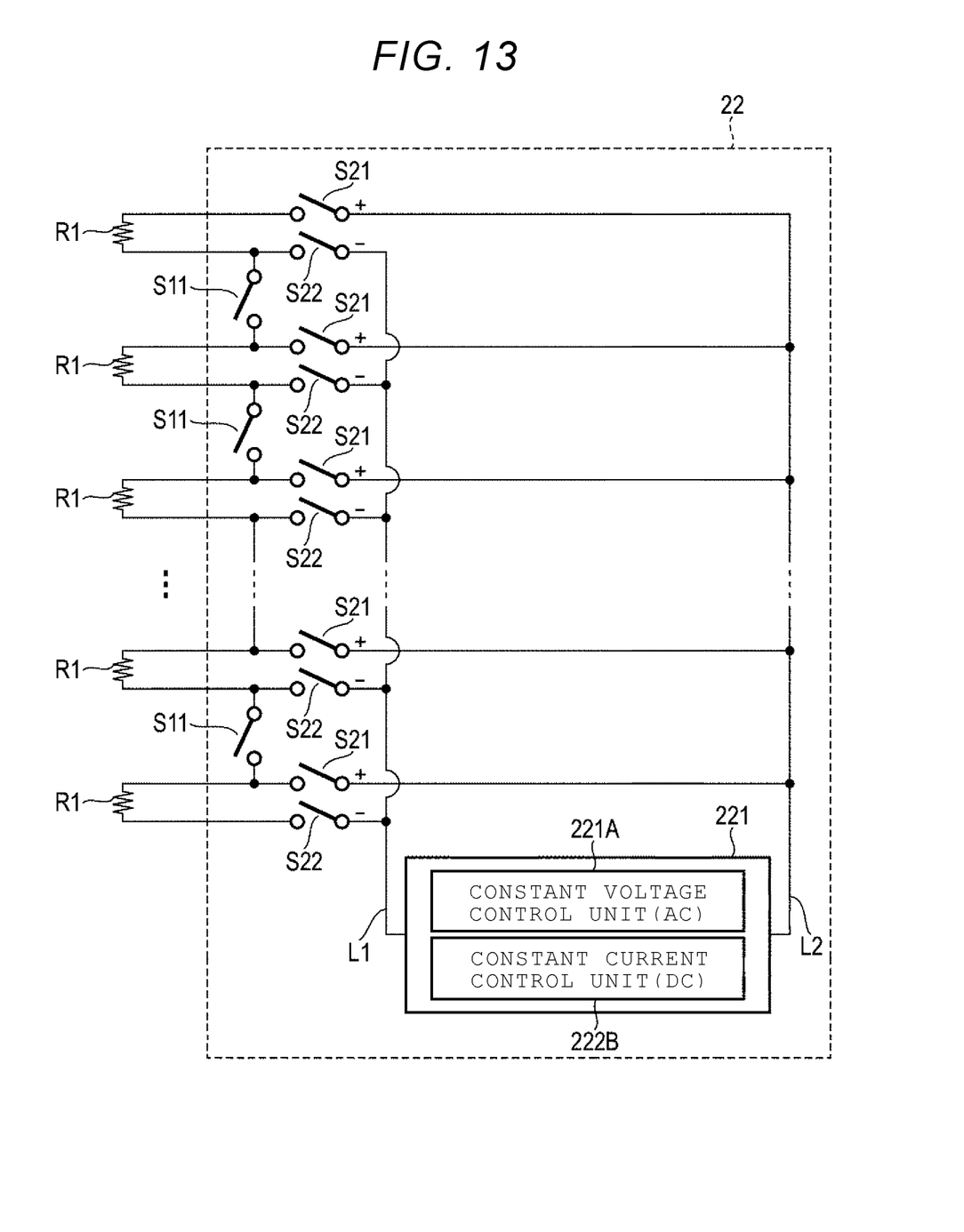
FIG. 13 is a diagram illustrating an example of connection between resistive elements respectively provided on a plurality of sliders and a head amplifier IC according to a third embodiment.

FIG. 13 is a diagram illustrating an example of connection between the resistive elements R1 respectively provided on the plurality of sliders 2 and the head amplifier IC. The head amplifier IC 22 and the plurality of resistive elements R1 are connected by connection lines L1 and L2. Switches S21 and S22 are provided between the connection lines L1 and L2. When the switches S21 and S22 are in the closed state, the plurality of resistance elements R1 and the head amplifier IC 22 are connected to each other, and when the switches S21 and S22 are in the open state, the plurality of resistance elements R1 and the head amplifier IC 22 are disconnected. The resistive elements R1 are provided on the sliders 2 one by one (see FIG. 4). One of the plurality of resistive elements R1 is connected to another adjacent resistive element R1 via a switch S11. When the switch S11 is in the closed state, the adjacent resistive element R1 is connected, and when the switch S11 is in the open state, the adjacent resistive element R1 is disconnected.

The opening and closing of the switch S11, and switches S21 and S22 is performed based on, for example, an instruction from the CPU 62. When the switch S11 is connected, the switch S21 (uppermost switch S21 in the figure) at an end portion and the switch S22 (lowermost switch S22 in the figure) at the other end portion are connected, and the other switches S21 and S22 are disconnected, the plurality of resistance elements R1 are connected in series with the head amplifier IC 22. On the other hand, when the switch S11 is disconnected and the switches S21 and S22 are connected, the plurality of resistive elements R1 are connected in parallel with the head amplifier IC 22. By connecting pairs of switches S21 and S22 one by one when the switch S11 is disconnected, it is also possible to connect the plurality of resistance elements R1 one by one to the head amplifier IC 22 in parallel. As such, based on the instruction of the CPU 62, the plurality of resistive elements R1 and the head amplifier IC 22 are configured to be connectable in series or in parallel, and the resistive elements R1 are also configured to be individually connectable to the head amplifier IC. That is, the CPU 62 can operate the head amplifier IC 22 in three modes of a series connection mode, a parallel connection mode, and the individual parallel connection mode. In the present embodiment, the case of operating in three modes of series connection mode, parallel connection mode, and individual parallel connection mode has been described, but a configuration in which the series connection mode and parallel connection mode are included may be adopted.

The head amplifier IC 22 includes a constant voltage control unit 221A and a constant current control unit 222B. Based on the instruction of the CPU 62, by applying a specified voltage to the constant voltage control unit 221A, the constant current control unit 222B enables the specified current to flow through the resistance element R1, and the resistance value can be measured in the three modes of the series connection mode, parallel connection mode, and the individual parallel connection mode.

In the series connection mode, the CPU 62 can detect whether there is contact between all the sliders 2 and the magnetic disk 1 in all the sliders 2 based on the change in the resistance value, and when it is determined that there is contact based on the change, the CPU 62 can detect which slider 2 has contacted by switching the connection destinations one by one in the individual parallel connection mode. Although detection is possible even in the parallel connection mode, power is required for detection, and the decrease in the S/N ratio becomes large. On the other hand, by using the individual parallel connection mode, the detection can be performed with low power, and the S/N ratio can be increased.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic disk device comprising:
   a plurality of magnetic disks;
   a plurality of sliders each including one or more resistive elements, each of which is arranged to face a recording surface of one of the plurality of magnetic disks; and
   a processor configured to detect a change in a resistance value of one or more of the resistive elements, wherein the resistive elements are electrically connected to each other through switches which are controlled to electrically connect the resistive elements in series or in parallel.

2. The magnetic disk device according to claim 1, wherein:
   the plurality of sliders respectively includes a heater that causes ahead surface of the respective slider to protrude onto the recording surface of one of the plurality of magnetic disks by thermal expansion, and
   the resistive element is a thermal resistive element and the resistance of the thermal resistive element changes when the heater generates heat that is applied to the slider in which the thermal resistive element is provided.

3. The magnetic disk device according to claim 2, wherein the head surface of the plurality of the sliders has a rectangular shape, and the resistive element is provided at the center position of the rectangular shape.

4. The magnetic disk device according to claim 2, wherein the head surface of the plurality of the sliders has a rectangular shape, and the resistive element is provided at each of four corners of the rectangular shape.

5. The magnetic disk device according to claim 2, wherein the head surface of the plurality of the sliders has a rectangular shape, and at least one resistive element is provided at a trailing side of the rectangular shape.

6. The magnetic disk device according to claim 5, wherein two resistive elements are provided at the trailing side of the rectangular shape.

7. The magnetic disk device according to claim 1, wherein the processor determines a presence of contact between at least one of the sliders and a corresponding one of the magnetic disks based on the detected change in the resistance value.

8. The magnetic disk device according to claim 7, wherein the processor determines the presence of contact between at least one of the sliders and the corresponding one of the magnetic disks during a patrol seek operation.

9. The magnetic disk device according to claim 8, further comprising:
   a memory, wherein
   the processor stores the determination result of the presence of contact between any one of the sliders and the corresponding one of the magnetic disks in the memory, and, when the number of the determination results indicating the presence of contact reaches a predetermined number, the processor outputs a notification that the predetermined number has been reached to a host.

10. The magnetic disk device according to claim 1, further comprising:
    a circuit electrically connected between the processor and the resistive elements and including the switches, wherein the switches include:
    first switches that electrically connect or disconnect adjacent resistive elements in series to the circuit, and
    second switches that electrically connect or disconnect the resistive elements and the circuit in parallel.

11. The magnetic disk device according to claim 10, wherein
    the processor is configured to detect the change in the resistance value in an individual parallel connection mode, in which all of the first switches are in an open state and the second switches are sequentially transitioned into a closed state while other second switches are in an open state, and a series connection mode, in which the first switches are in a closed state, the second switches positioned at a first end portion and a second end portion of the switches are in a closed state, and other second switches are in an open state.

12. The magnetic disk device according to claim 11, wherein
    the processor is configured to detect the change in the resistance value in the individual parallel connection mode to sequentially detect the change in the resistance values of the resistive elements upon detecting the change in the resistance value of the resistive elements in the series connection mode.

13. A magnetic disk device comprising:
    a plurality of magnetic disks;
    a plurality of sliders each including one or more resistive elements, each of which is arranged to face a recording surface of one of the plurality of magnetic disks;
    a first circuit to which a first group of the resistive elements are electrically connected in series;
    a second circuit to which a second group of the resistive elements are electrically connected in series; and
    a processor configured to detect a change in a resistance value of one or more of the resistive elements in the first group or the second group.

14. The magnetic disk device according to claim 13, wherein:
    the plurality of sliders respectively includes a heater that causes ahead surface of the respective slider to protrude onto the recording surface of one of the plurality of magnetic disks by thermal expansion, and
    the resistive element is a thermal resistive element and the resistance of the thermal resistive element changes when the heater generates heat that is applied to the slider in which the thermal resistive element is provided.

15. The magnetic disk device according to claim 14, wherein
    the head surface of the plurality of the sliders has a rectangular shape, and the resistive element is provided at the center position of the rectangular shape.

16. The magnetic disk device according to claim 14, wherein
    the head surface of the plurality of the sliders has a rectangular shape, and the resistive element is provided at each of four corners of the rectangular shape.

17. The magnetic disk device according to claim 14, wherein
    the head surface of the plurality of the sliders has a rectangular shape, and at least one resistive element is provided at a trailing side of the rectangular shape.

18. The magnetic disk device according to claim 17, wherein two resistive elements are provided at the trailing side of the rectangular shape.

19. The magnetic disk device according to claim 13, wherein
    the processor determines a presence of contact between at least one of the sliders and a corresponding one of the magnetic disks based on the detected change in the resistance value.

20. The magnetic disk device according to claim 13, wherein
    the processor determines the presence of contact between at least one of the sliders and the corresponding one of the magnetic disks during a patrol seek operation.

* * * * *

UNITED STATES PATENT AND TRADEMARK OFFICE
CERTIFICATE OF CORRECTION

PATENT NO. : 11,410,695 B1
APPLICATION NO. : 17/407471
DATED : August 9, 2022
INVENTOR(S) : Masami Yamane It is certified that error appears in the above-identified patent and that said Letters Patent is hereby corrected as shown below:

In the Claims

In Claim 2, Line 30, please delete "ahead" and replace with --a head--.
In Claim 14, Line 50, please delete "ahead" and replace with --a head--.

Signed and Sealed this
Twentieth Day of December, 2022

Katherine Kelly Vidal
*Director of the United States Patent and Trademark Office*